United States Patent
Feng et al.

(10) Patent No.: US 11,628,743 B2
(45) Date of Patent: Apr. 18, 2023

(54) VEHICLE, AND EQUALIZATION METHOD AND DEVICE FOR POWER BATTERY PACK

(71) Applicant: BYD COMPANY LIMITED, Guangdong (CN)

(72) Inventors: Tianyu Feng, Shenzhen (CN); Linwang Deng, Shenzhen (CN); Chun Lv, Shenzhen (CN); Siqi Lin, Shenzhen (CN); Zihua Yang, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 71 days.

(21) Appl. No.: 17/042,774

(22) PCT Filed: Mar. 25, 2019

(86) PCT No.: PCT/CN2019/079454
§ 371 (c)(1),
(2) Date: Sep. 28, 2020

(87) PCT Pub. No.: WO2019/184849
PCT Pub. Date: Oct. 3, 2019

(65) Prior Publication Data
US 2021/0016680 A1    Jan. 21, 2021

(30) Foreign Application Priority Data
Mar. 30, 2018    (CN) .......................... 201810288760.5

(51) Int. Cl.
*B60L 58/22*    (2019.01)
*H02J 7/00*    (2006.01)
(Continued)

(52) U.S. Cl.
CPC .............. *B60L 58/22* (2019.02); *B60L 58/12* (2019.02); *H01M 10/441* (2013.01);
(Continued)

(58) Field of Classification Search
CPC ...... B60L 58/12; B60L 58/22; H01M 10/425; H01M 10/441; H01M 10/482; H01M 2010/427; H02J 7/0014
(Continued)

(56) References Cited

U.S. PATENT DOCUMENTS

| | | | |
|---|---|---|---|
| 5,808,445 A | * | 9/1998 | Aylor .................. H02J 7/00047 320/132 |
| 10,038,223 B2 | | 7/2018 | Kolosnitsyn et al. |

(Continued)

FOREIGN PATENT DOCUMENTS

| | | |
|---|---|---|
| CN | 102544604 A | 7/2012 |
| CN | 102590754 A | 7/2012 |

(Continued)

OTHER PUBLICATIONS

European Patent Office, Extended European Search Report, EP Patent Application No. 19777123.1, dated Dec. 23, 2020, nine pages.

(Continued)

*Primary Examiner* — Edward Tso
*Assistant Examiner* — Aaron Piggush

(57) ABSTRACT

Disclosed are an automobile, and a power battery pack equalization method and device, the method comprises the following steps: acquiring a high voltage inflection point of the charging curve of a battery cell of the power battery pack and acquiring the capacity of the battery cell according to the high voltage inflection point of the battery cell, and equalizing the battery cell according to the capacity of the battery cell. Hence, equalization management of the power battery pack can be realized, thereby improving the use ratio of the power battery pack and prolonging the service life of the power battery pack.

18 Claims, 2 Drawing Sheets

(51) Int. Cl.
  *B60L 58/12* (2019.01)
  *H01M 10/44* (2006.01)
  *H01M 10/48* (2006.01)
  *H01M 10/42* (2006.01)

(52) U.S. Cl.
  CPC ......... *H01M 10/482* (2013.01); *H02J 7/0014* (2013.01); *H01M 10/425* (2013.01); *H01M 2010/4271* (2013.01)

(58) Field of Classification Search
  USPC .......................... 320/134, 132, 133, 156, 104
  See application file for complete search history.

(56) References Cited

U.S. PATENT DOCUMENTS

| | | | | |
|---|---|---|---|---|
| 2009/0096420 | A1* | 4/2009 | Lupu | H02J 7/0016 320/122 |
| 2010/0244781 | A1* | 9/2010 | Kramer | H02J 7/0016 320/162 |
| 2011/0012604 | A1* | 1/2011 | Tsujiko | H01M 4/5825 324/427 |
| 2016/0006082 | A1 | 1/2016 | Kolosnitsyn et al. | |
| 2017/0170668 | A1* | 6/2017 | Hayashizaki | H01M 10/486 |
| 2017/0212170 | A1* | 7/2017 | Torai | H01M 10/482 |
| 2017/0212203 | A1 | 7/2017 | Young et al. | |
| 2017/0259687 | A1* | 9/2017 | Chikkannanavar | H02J 7/00308 |
| 2018/0248386 | A1* | 8/2018 | Hale | H02J 7/007184 |

FOREIGN PATENT DOCUMENTS

| | | |
|---|---|---|
| CN | 103427459 A | 12/2013 |
| CN | 105190961 A | 12/2015 |
| CN | 107852013 A | 3/2018 |
| GB | 2504228 | 1/2014 |
| GB | 2541419 | 2/2017 |

OTHER PUBLICATIONS

PCT International Search Report, PCT/CN2019/079454, dated Jun. 14, 2019, 4 Pages.

* cited by examiner

VEHICLE, AND EQUALIZATION METHOD AND DEVICE FOR POWER BATTERY PACK

CROSS-REFERENCE TO RELATED APPLICATIONS

This application is the National Stage of International Application No. PCT/CN2019/079454, "Automobile, Power Battery Pack Equalization Method and Device," filed on Mar. 25, 2019; which claims priority to Chinese Patent Application No. 201810288760.5 filed on Mar. 30, 2018; all of which are incorporated herein by reference in their entirety.

FIELD

The present disclosure relates to the field of vehicle technologies, and in particular to, an equalization method for a power battery pack, an equalization device for a power battery pack, and a vehicle with the device.

BACKGROUND

A cell of a power battery (such as a lithium-ion battery) has a voltage of only a few volts, and a capacity of the cell is relatively small. Whether the power battery is used as a power source of an electric vehicle or is applied to the field of backup power sources, electrical characteristics of the cells of the power battery cannot meet voltage and current requirements of a load in a working condition. Therefore, in order to increase a capacity and a voltage of the power battery, several cells need to be connected in series to form a pack. At present, a series battery pack is widely applied to the fields of electric vehicles and backup power sources.

After batteries are used as a pack, a service life, a capacity, and a power of the battery pack depends on a worst-performing cell, thereby shortening the service life of the battery pack.

In the related art, a top-aligned equalization strategy is proposed, so that high-voltage ends of cells are aligned by discharging the high-voltage cells. A determining condition of starting equalization is based on a voltage difference between cells of the battery pack. In a battery management system (BMS), a charge cut-off voltage of each cell is first recorded under full charge, and then an equalization time for turning on is calculated based on a voltage difference. A moment of starting equalization is a moment at which the voltage difference between the cells is greater than a preset value. For example, when a highest voltage of a battery is 3.6 V, voltages of all batteries are compared with a lowest voltage of a battery. When a voltage difference □V>100 mV, the equalization starts, and an equalization time is 10 h.

However, the above equalization strategy has the following disadvantages:

(1) The battery pack needs to be fully charged, that is, the battery pack must be fully charged and a charging protection threshold is triggered before the top equalization strategy can be started.

(2) State of charge (SOC) misalignment cannot be accurately predicted.

(3) If the SOC misalignment is large, the alignment cannot be completed at one time.

SUMMARY

The present disclosure is intended to resolve at least one of the technical problems in the foregoing technology to some extent. In view of the above, a first objective of the present disclosure is to provide an equalization method for a power battery pack, so that equalization management of the power battery pack can be implemented, thereby improving utilization of the power battery pack and prolonging a service life of the power battery pack.

A second objective of the present disclosure is to provide an equalization device for a power battery pack.

A third objective of the present disclosure is to provide a vehicle.

In order to achieve the above objectives, an embodiment of a first aspect of the present disclosure provides an equalization method for a power battery pack, the method including the following steps: obtaining a high voltage turning point of a charging curve of a cell of the power battery pack; obtaining a capacity of the cell according to the high voltage turning point of the cell; and equalizing the cell according to the capacity of the cell.

According to the equalization method for the power battery pack in this embodiment of the present disclosure, the high voltage turning point of the charging curve of the cell of the power battery pack is obtained, the capacity of the cell is obtained according to the high voltage turning point of the cell, and the cell is equalized according to the capacity of the cell. Therefore, according to this method, equalization management of the power battery pack can be implemented, thereby improving utilization of the power battery pack and prolonging a service life of the power battery pack.

Additionally, the equalization method for the power battery pack provided in the foregoing embodiment of the present disclosure may further have the following additional technical features:

According to an embodiment of the present disclosure, the obtaining a high voltage turning point of a charging curve of a cell of the power battery pack specifically includes: performing first-order derivation on the charging curve to obtain the high voltage turning point.

According to an embodiment of the present disclosure, the equalizing the cells according to the capacities of the cells specifically includes: obtaining a maximum capacity of cells and an average capacity of the cells of the power battery pack; generating an equalization capacity according to the maximum capacity and the average capacity of the cells; and equalizing the cell according to the equalization capacity.

According to an embodiment of the present disclosure, the equalizing the cell according to the equalization capacity specifically includes: obtaining an equalization current; generating an equalization time according to the equalization current and the equalization capacity; and equalizing the cell according to the equalization capacity and the equalization time.

According to an embodiment of the present disclosure, a capacity of a farthest cell of the cells of the power battery pack is used as the maximum capacity.

According to an embodiment of the present disclosure, before the equalizing the cell, the equalization method for the power battery pack further includes: obtaining a capacity difference between the maximum capacity and a capacity of each cell; and determining, according to the capacity difference, whether SOC misalignment occurs.

In order to achieve the above objectives, an embodiment of a second aspect of the present disclosure provides an equalization device for a power battery pack, the device including: a first obtaining module configured to obtain a high voltage turning point of a charging curve of a cell of the power battery pack; a second obtaining module configured to obtain a capacity of the cell according to the high voltage turning point of the cell; and a control module configured to equalize the cell according to the capacity of the cell.

According to the equalization device for the power battery pack in this embodiment of the present disclosure, the first obtaining module obtains the high voltage turning point of the charging curve of the cell of the power battery pack, the second obtaining module obtains the capacity of the cell according to the high voltage turning point of the cell, and the control module equalizes the cell according to the capacity of the cell. Therefore, according to this device, equalization management of the power battery pack can be implemented, thereby improving utilization of the power battery pack and prolonging a service life of the power battery pack.

Additionally, the equalization device for the power battery pack provided in the foregoing embodiment of the present disclosure may further have the following additional technical features:

According to an embodiment of the present disclosure, that a first obtaining module obtains a high voltage turning point of a charging curve of a cell of the power battery pack specifically includes: performing first-order derivation on the charging curve to obtain the high voltage turning point.

According to an embodiment of the present disclosure, that a control module equalizes the cell according to the capacity of the cell specifically includes: obtaining a maximum capacity of cells and an average capacity of the cells of the power battery pack; generating an equalization capacity according to the maximum capacity and the average capacity of the cells; and equalizing the cell according to the equalization capacity.

According to an embodiment of the present disclosure, that the control module equalizes the cell according to the equalization capacity specifically includes: obtaining an equalization current; generating an equalization time according to the equalization current and the equalization capacity; and equalizing the cell according to the equalization capacity and the equalization time.

According to an embodiment of the present disclosure, a capacity of a farthest cell of the cells of the power battery pack is used as the maximum capacity.

According to an embodiment of the present disclosure, before equalizing the cell, the control module is further configured to: obtain a capacity difference between the maximum capacity and a capacity of each cell; and determine, according to the capacity difference, whether SOC misalignment occurs.

In order to achieve the above objectives, an embodiment of a third aspect of the present disclosure provides a vehicle, including the above equalization device for the power battery pack.

According to the vehicle in this embodiment of the present disclosure, equalization management of the power battery pack can be implemented through the above equalization device for the power battery pack, thereby improving utilization of the power battery pack and prolonging a service life of the power battery pack.

DETAILED DESCRIPTION

Figure 1:
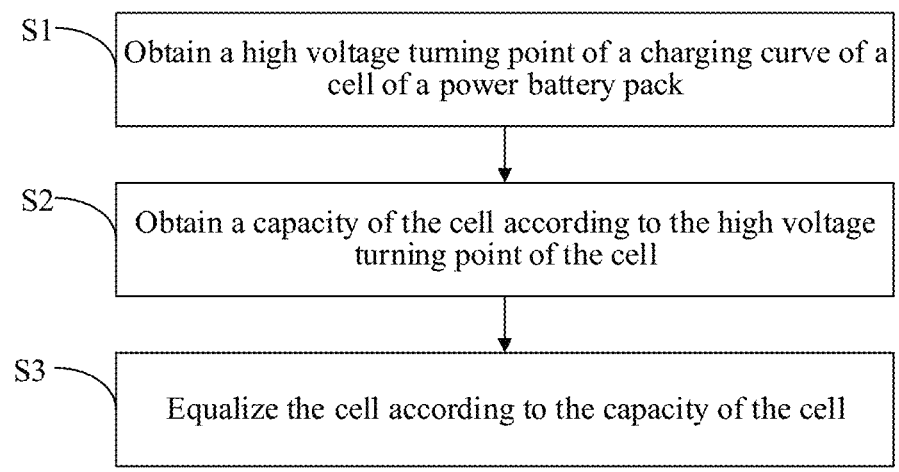
FIG. 1 is a flowchart of an equalization method for a power battery pack according to an embodiment of the present disclosure.

Embodiments of the present disclosure are described in detail below, and examples of the embodiments are shown in the accompanying drawings, where the same or similar elements or the elements having same or similar functions are denoted by the same or similar reference numerals throughout the description. The embodiments described below with reference to the accompanying drawings are exemplary and used only for explaining the present disclosure, and should not be construed as a limitation on the present disclosure.

The following describes an equalization method for a power battery pack, an equalization device for a power battery pack, and a vehicle with the device provided in the embodiments of the present disclosure with reference to the accompanying drawings.

FIG. 1 is a flowchart of an equalization method for a power battery pack according to an embodiment of the present disclosure.

In an embodiment of the present disclosure, the power battery pack may include a plurality of cells connected in series, where the cell may be a lithium battery.

As shown in FIG. 1, the equalization method for the power battery pack in this embodiment of the present disclosure may include the following steps.

S1. Obtain a high voltage turning point of a charging curve of a cell of the power battery pack.

In a BMS of a vehicle, a plurality of V-Q, V-SOC, V-state of energy (SOE), open circuit voltage (OCV)-Q, OCV-SOC, and OCV-SOE curves of each cell at different temperatures, magnifications, and aging degrees are stored in advance, where V represents a cell voltage, Q represents a cell capacity, and a unit of Q is generally represented by Ah or mAh.

When the power battery pack is charged, the BMS collects and records parameters of each cell in real time, where parameters may include a total voltage, a total current, a voltage of each cell, a temperature of each cell, and the like and are used to determine whether the power battery pack is overcharged, overdischarged, over-temperature, short-circuited, and the like; and pre-processes data and stores the data in a cloud server for backup according to different charging currents, temperatures, SOC, and the like. A curve under the current parameters is retrieved from the BMS, and is processed through one or more algorithms of filtering, integration, differentiation, fitting, a wavelet analysis, and a neural network to obtain the charging curve of the cell of the power battery pack.

In an embodiment of the present disclosure, the obtaining a high voltage turning point of a charging curve of a cell of the power battery pack specifically includes: performing first-order derivation on the charging curve to obtain the high voltage turning point.

Figure 2:
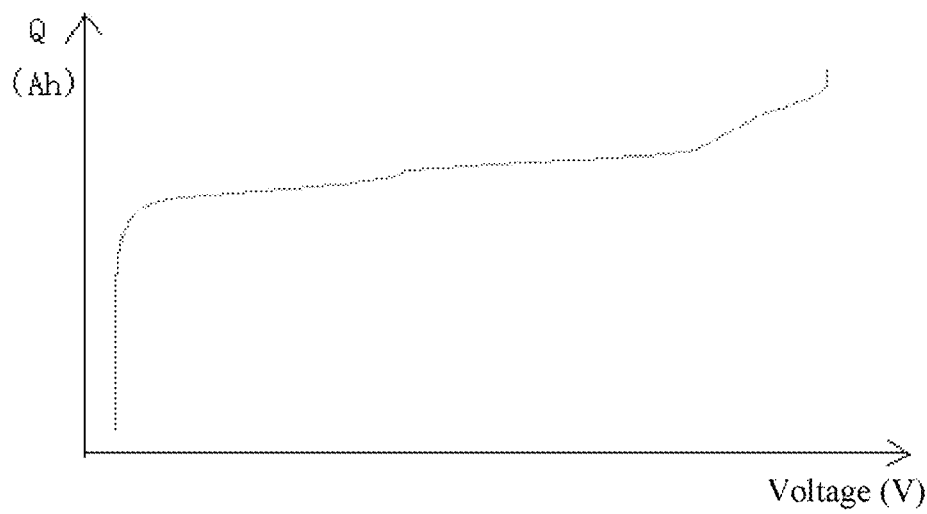
FIG. 2 is a schematic diagram of a charging curve and a derivative curve of a cell according to an embodiment of the present disclosure.
Figure 2:
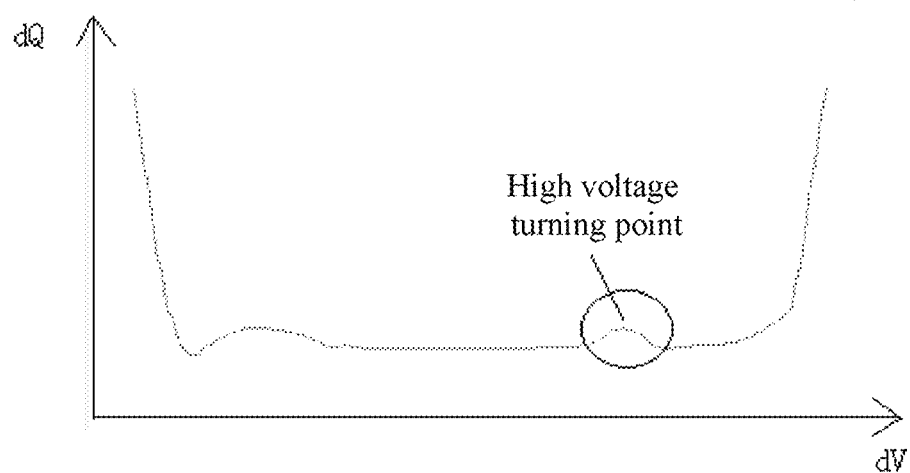

After the charging curve of the cell is obtained, first-order derivation, namely, dV/dQ derivation, is performed to obtain a first-order derivation curve. When the BMS detects a last curve turning point with a positive peak, the turning point is referred to as a low voltage turning point $V_{LVTP}$, and then a middle voltage platform (MVP) charging stage is entered. When the BMS detects a curve turning point whose peak value exceeds the preset threshold, the turning point is referred to as a high voltage turning point $V_{HVTP}$, and then a high voltage platform (HVP) charging stage is entered. For example, as shown in FIG. 2, two turning points appear in the derivation curve, and a second turning point is a high voltage turning point. According to the above method, a high voltage turning point of a charging curve of each cell of the power battery pack may be obtained.

S2. Obtain a capacity of the cell according to the high voltage turning point of the cell. After the high voltage turning point of the charging curve of the cell is obtained, a capacity of the cell corresponding to the high voltage turning point may be obtained, and capacity values of cells corresponding to high voltage turning points are different.

S3. Equalize the cell according to the capacity of the cell.

According to an embodiment of the present disclosure, the equalizing the cell according to the capacity of the cell specifically includes: obtaining a maximum capacity of cells and an average capacity of the cells of the power battery pack; generating an equalization capacity according to the maximum capacity and the average capacity of the cells; and equalizing the cell according to the equalization capacity.

According to an embodiment of the present disclosure, the equalizing the cell according to the equalization capacity specifically includes: obtaining an equalization current; generating an equalization time according to the equalization current and the equalization capacity; and equalizing the cell according to the equalization capacity and the equalization time.

In an embodiment of the present disclosure, a capacity of a farthest cell of the cells is used as the maximum capacity. For example, when cells are connected in series to form a power battery pack, a capacity of a rightmost cell (for example, an end of a positive output terminal) in the cells connected in series may be used as the maximum capacity and is denoted as Q(max), a capacity of each cell is denoted as Q(n), and n is a positive integer.

After the capacity of the cell is obtained according to the high voltage turning point of the cell, the capacity of the rightmost cell in the cells is used as the maximum capacity, and an average capacity of the plurality of cells is obtained and denoted as Q'(n), where Q'(n)=(Q(1)+Q(2)+ . . . +Q(n))/n. Thus, the required equalization capacity ΔQ can be obtained, and ΔQ=Q(max)−Q'(n). In addition, an equalization current $I_{equalization}$ is further obtained, an equalization time t is calculated according to a formula $t=\Delta Q/I_{equalization}$, equalization parameters (including the equalization time and the equalization capacity) are updated, and then the cell is equalized according to a latest equalization time t and the equalization capacity ΔQ.

Therefore, according to the equalization method for the power battery pack in this embodiment of the present disclosure, the equalization strategy does not need to be performed when the power battery pack is fully charged, and a derivative algorithm is run when the power battery pack is being charged or the charging ends. The high voltage turning point is obtained, the maximum capacity and the average capacity of the cells are obtained according to the high voltage turning point to obtain the equalization capacity, and then the equalization time is obtained according to the equalization capacity and the equalization current, to equalize the cell according to the equalization time and the equalization capacity, thereby improving utilization of the power battery pack and prolonging a service life of the power battery pack.

According to an embodiment of the present disclosure, before the equalizing the cell, the equalization method for the power battery pack further includes: obtaining a capacity difference between the maximum capacity and a capacity of each cell; and determining, according to the capacity difference, whether SOC misalignment occurs.

Figure 3A:
FIG. 3a to FIG. 3c are schematic diagrams of equalization of a power battery pack according to an embodiment of the present disclosure.

It should be noted that equalization is performed to eliminate SOC misalignment. Taking two cells connected in series as an example (as shown in FIG. 3a), a box size represents a usable capacity of each of the two cells, and a filled region represents a maximum capacity that can be released after the two cells are connected in series. When SOC misalignment occurs, for example, the tops or the bottoms are not aligned, When the two cells connected in series are discharged, only a capacity of an overlapping part (a filled region) of the two boxes can be released, and a capacity of a remaining region (without filling) cannot be released.

After the maximum capacity and a capacity of each cell are obtained, a capacity difference between the maximum capacity and the capacity of each cell is calculated. For example, a capacity difference between the maximum capacity Q(max) and a capacity Q(1) of a first cell is: Q(max)−Q(1), and it can be determined whether SOC misalignment occurs according to the capacity difference. Taking the two cells shown in FIG. 3a to FIG. 3c as an example, SOC misalignment=extra capacity charged after the tops of the two cells are aligned/total capacity of the power battery pack before alignment. If it is determined that SOC misalignment occurs, the above equalization strategy is performed. The equalization capacity is generated according to the maximum capacity and the average capacity, the equalization time is obtained according to the equalization capacity and the equalization current, and a plurality of cells are equalized according to the equalization capacity and the equalization time.

The two cells connected in series shown in FIG. 3a are as an example. If it is determined that SOC misalignment of the two cells occurs, the above equalization strategy is performed, and the tops or the bottoms of the two cells are aligned to the state shown in FIG. 3b. In this way, unfilled regions at the tops of the two cells can continue to be charged to the state shown in FIG. 3c, thereby increasing a usable capacity of the power battery pack. Therefore, when a right cell with a minimum capacity is discharged next time, a depth of discharge (DOD) is increased to 100%.

Figure 3B:
Figure 3C:

It should be noted that FIG. 3a to FIG. 3c are only an embodiment of the present disclosure. When a quantity of cells is greater than or equal to three, the same equalization strategy is adopted, and a cell with a maximum capacity is used as a benchmark. Specific examples are not given herein.

Therefore, according to the equalization method for the power battery pack in this embodiment of the present disclosure, it can be ensured that a DOD of a cell with a minimum capacity is the largest, and service lives of other cells are prolonged. In addition, the SOC misalignment can be accurately learned and the alignment can be completed at one time, to improve equalization efficiency, thereby improving the consistency and use efficiency of the power battery pack.

In view of the above, according to the equalization method for the power battery pack in this embodiment of the present disclosure, the high voltage turning point of the charging curve of each cell is obtained, the capacity of the cell is obtained according to the high voltage turning point of the cell, and the cell is equalized according to the capacity of the cell. Therefore, according to this method, equalization management of the power battery pack can be implemented, thereby improving utilization of the power battery pack and prolonging a service life of the power battery pack.

Figure 4:
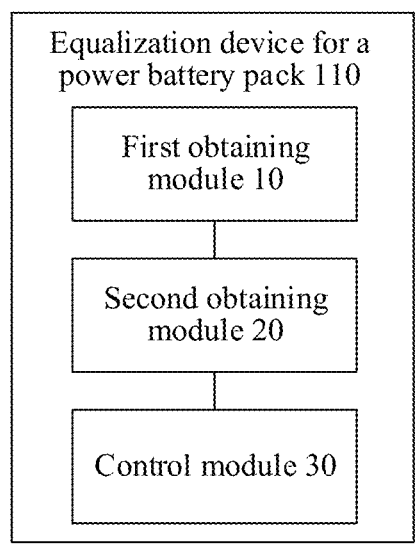
FIG. 4 is a schematic block diagram of an equalization device for a power battery pack according to an embodiment of the present disclosure.

FIG. 4 is a schematic block diagram of an equalization device for a power battery pack according to an embodiment of the present disclosure. In an embodiment of the present disclosure, the power battery pack may include a plurality of cells connected in series.

As shown in FIG. 4, the equalization device for the power battery pack in this embodiment of the present disclosure may include a first obtaining module 10, a second obtaining module 20, and a control module 30.

The first obtaining module 10 is configured to obtain a high voltage turning point of a charging curve of a cell of the power battery pack. The second obtaining module 20 is configured to obtain a capacity of the cell according to the high voltage turning point of the cell. The control module 30 is configured to equalize the cell according to the capacity of the cell.

According to an embodiment of the present disclosure, that the first obtaining module 10 obtains a high voltage turning point of a charging curve of a cell of the power battery pack specifically includes: performing first-order derivation on the charging curve to obtain the high voltage turning point.

According to an embodiment of the present disclosure, that the control module 30 equalizes the plurality of cells according to the capacities of the plurality of cells specifically includes: obtaining a maximum capacity of the plurality of cells and an average capacity of the cells of the power battery pack; generating an equalization capacity according to the maximum capacity and the average capacity of the cells; and equalizing the cell according to the equalization capacity.

According to an embodiment of the present disclosure, that the control module 30 equalizes the plurality of cells according to the equalization capacity specifically includes: obtaining an equalization current; generating an equalization time according to the equalization current and the equalization capacity; and equalizing the cell according to the equalization capacity and the equalization time.

According to an embodiment of the present disclosure, a capacity of a farthest cell of the cells of the power battery pack is used as the maximum capacity.

According to an embodiment of the present disclosure, before equalizing the cell, the control module 30 is further configured to: obtain a capacity difference between the maximum capacity and a capacity of each cell; and determine, according to the capacity difference, whether SOC misalignment occurs.

It should be noted that for details not disclosed in the equalization device for the power battery pack in this embodiment of the present disclosure, refer to the details disclosed in the equalization method for the power battery pack in the embodiments of the present disclosure. Details are not described herein.

According to the equalization device for the power battery pack in this embodiment of the present disclosure, the first obtaining module obtains the high voltage turning point of the charging curve of the cell of the power battery pack, the second obtaining module obtains the capacity of the cell according to the high voltage turning point of the cell, and the control module equalizes the cell according to the capacity of the cell. Therefore, according to this device, equalization management of the power battery pack can be implemented, thereby improving utilization of the power battery pack and prolonging a service life of the power battery pack.

Figure 5:
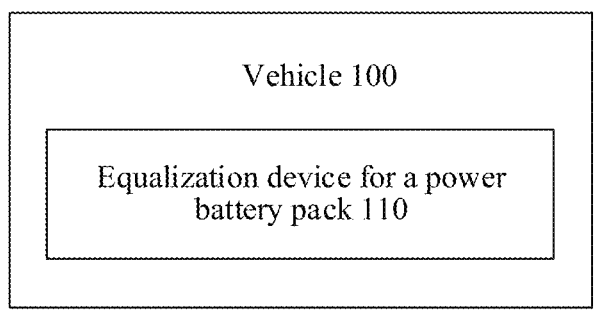
FIG. 5 is a block diagram of a vehicle according to an embodiment of the present disclosure.

FIG. 5 is a block diagram of a vehicle according to an embodiment of the present disclosure. As shown in FIG. 5, this embodiment of the present disclosure further provides a vehicle 100, including the above equalization device 110 for the power battery pack.

According to the vehicle in this embodiment of the present disclosure, equalization management of the power battery pack can be implemented through the above equalization device for the power battery pack, thereby improving utilization of the power battery pack and prolonging a service life of the power battery pack.

In the description of the present disclosure, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial", "radial", and "circumferential" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure.

In addition, terms "first" and "second" are used only for a purpose of description, and shall not be construed as indicating or implying relative importance or implying a quantity of indicated technical features. Therefore, a feature restricted by "first" or "second" may explicitly indicate or implicitly include one or more such features. In description of the present disclosure, "multiple" means at least two, such as two and three unless it is specifically defined otherwise.

In the present disclosure, unless otherwise explicitly specified or defined, the terms such as "mount", "install", "connect", "connection", and "fixed" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components or mutual interaction relationship between two components. A person of ordinary skill in the art can understand specific meanings of the terms in the present disclosure based on specific situations.

In the present disclosure, unless otherwise explicitly specified or defined, the first feature being located "above" or "below" the second feature may be the first feature being in a direct contact with the second feature, or the first feature being in an indirect contact with the second feature through an intermediary. In addition, the first feature being located "above" the second feature may be the first feature being located directly above or obliquely above the second feature, or may simply indicate that the first feature is higher in level than the second feature. The first feature being located "below" the second feature may be the first feature being located directly below or obliquely below the second feature, or may simply indicate that the first feature is lower in level than the second feature.

In the description of this specification, the description of the reference terms "an embodiment", "some embodiments", "an example", "a specific example", "some examples," and the like means that specific features, structures, materials or characteristics described in combination with the embodiment(s) or example(s) are included in at least one embodiment or example of the present disclosure. In this specification, exemplary representations of the above terms do not necessarily refer to the same embodiment or example. Moreover, the described specific features, structures, materials or characteristics may be combined in a suitable manner in any one or more embodiments or examples. In addition, in a case that is not mutually contradictory, a person skilled in the art can combine or group different embodiments or examples that are described in this specification and features of the different embodiments or examples.

Although the embodiments of the present disclosure have been shown and described above, it can be understood that, the foregoing embodiments are exemplary and should not be understood as limitation to the present disclosure. A person of ordinary skill in the art can make changes, modifications, replacements, or variations to the foregoing embodiments within the scope of the present disclosure.

What is claimed is:

1. An equalization method for a power battery pack comprising a plurality of cells, the method comprising:
    obtaining a high voltage turning point of a charging curve of each of the cells of the power battery pack; wherein
        the charging curve comprises a middle voltage platform charging stage followed by a high voltage platform charging stage, the charging curve enters the middle voltage platform charging stage after passing a low voltage turning point, and the charging curve enters the high voltage platform charging stage after passing the high voltage turning point, and
        turning points comprise positive peaks of a dV/dQ first-order derivation curve of the charging curve, and when a peak value of one of the turning points is higher than a threshold, the one of the turning points is determined as the high voltage turning point;
    obtaining a capacity of each of the cells according to the high voltage turning point; and
    equalizing the cells according to the capacities of the cells.

2. The equalization method for the power battery pack according to claim 1, wherein obtaining the high voltage turning point of the charging curve comprises:
    performing a first-order derivation on the charging curve; and
    obtaining the high voltage turning point according to the first-order derivation.

3. The equalization method for the power battery pack according to claim 1, wherein equalizing the cells according to the capacities of the cells comprises:
    obtaining a maximum capacity and an average capacity of the cells of the power battery pack;
    generating an equalization capacity according to the maximum capacity and the average capacity of the cells; and
    equalizing the cells according to the equalization capacity.

4. The equalization method for the power battery pack according to claim 3, wherein equalizing the cells according to the equalization capacity comprises:
    obtaining an equalization current;
    generating an equalization time according to the equalization current and the equalization capacity; and
    equalizing the cells according to the equalization capacity and the equalization time.

5. The equalization method for the power battery pack according to claim 3, wherein the cells are connected in series, and a capacity of a cell at one end of the cells connected in series of the power battery pack is used as the maximum capacity.

6. The equalization method for the power battery pack according to claim 1, further comprising, before the equalizing the cells:
    obtaining a maximum capacity of the cells of the power battery pack;
    obtaining a capacity difference between the maximum capacity and the capacity of each of the cells; and
    determining, according to the capacity difference, whether state of charge (SOC) misalignment occurs.

7. The equalization method for the power battery pack according to claim 6, wherein equalizing the cells is performed in response to determining the SOC misalignment occurs.

8. The equalization method for the power battery pack according to claim 1, wherein the equalization method is performed when the power battery pack is not fully charged.

9. The equalization method for the power battery pack according to claim 1, wherein the equalization method is performed for all of the cells of the power battery pack.

10. An equalization device for a power battery pack comprising a plurality of cells, the device comprising:
    a first obtaining module configured to obtain a high voltage turning point of a charging curve of each of the cells of the power battery; wherein
        the charging curve comprises a middle voltage platform charging stage followed by a high voltage platform charging stage, the charging curve enters the middle voltage platform charging stage after passing a low voltage turning point, and the charging curve enters the high voltage platform charging stage after passing the high voltage turning point, and
        turning points comprise positive peaks of a dV/dQ first-order derivation curve of the charging curve, and when a peak value of one of the turning points is higher than a threshold, the one of the turning points is determined as the high voltage turning point;
    a second obtaining module configured to obtain a capacity of each of the cells according to the high voltage turning point; and
    a control module configured to equalize the cells according to the capacities of the cells.

11. The equalization device for the power battery pack according to claim 10, wherein the first obtaining module is further configured to:
    perform a first-order derivation on the charging curve; and
    obtain the high voltage turning point according to the first-order derivation.

12. The equalization device for the power battery pack according to claim 10, wherein the control module is further configured to:
    obtain a maximum capacity and an average capacity of the cells of the power battery pack;
    generate an equalization capacity according to the maximum capacity and the average capacity of the cells; and
    equalize the cells according to the equalization capacity.

13. The equalization device for the power battery pack according to claim 12, wherein the control module is further configured to:
obtain an equalization current;
generate an equalization time according to the equalization current and the equalization capacity; and
equalize the cells according to the equalization capacity and the equalization time.

14. The equalization device for the power battery pack according to claim 12, wherein the cells are connected in series, and a capacity of a cell at one end of the cells connected in series of the power battery pack is used as the maximum capacity.

15. The equalization device for the power battery pack according to claim 10, wherein before equalizing the cells, the control module is further configured to:
obtain a maximum capacity of the cells of the power battery pack;
obtain a capacity difference between the maximum capacity and the capacity of each of the cells; and
determine, according to the capacity difference, whether state of charge (SOC) misalignment occurs.

16. The equalization device for the power battery pack according to claim 15, the control module equalizes the cells in response to determining the SOC misalignment occurs.

17. The equalization device for the power battery pack according to claim 10, wherein control module configured to equalize the cells when the power battery pack is not fully charged.

18. An electric vehicle, comprising:
a power battery pack comprising a plurality of cells, wherein the power battery pack is used as a power source for the electric vehicle; and
an equalization device for the power battery pack comprising:
a first obtaining module configured to obtain a high voltage turning point of a charging curve of each of the cells of the power battery; wherein
the charging curve comprises a middle voltage platform charging stage followed by a high voltage platform charging stage, the charging curve enters the middle voltage platform charging stage after passing a low voltage turning point, and the charging curve enters the high voltage platform charging stage after passing the high voltage turning point, and
turning points comprise positive peaks of a dV/dQ first-order derivation curve of the charging curve, and when a peak value of one of the turning points is higher than a threshold, the one of the turning points is determined as the high voltage turning point;
a second obtaining module configured to obtain a capacity of each of the cells according to the high voltage turning point; and
a control module configured to equalize the cells according to the capacities of the cells.

* * * * *